(12) United States Patent
Chen et al.

(10) Patent No.: US 11,053,330 B2
(45) Date of Patent: Jul. 6, 2021

(54) ESTERIFICATION METHOD OF COPOLYMER

(71) Applicant: NATIONAL TSING HUA UNIVERSITY, Hsinchu (TW)

(72) Inventors: Chien-Tien Chen, Hsinchu (TW); Yi-Ya Liao, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 70 days.

(21) Appl. No.: 16/574,987

(22) Filed: Sep. 18, 2019

(65) Prior Publication Data
US 2020/0095348 A1 Mar. 26, 2020

(30) Foreign Application Priority Data
Sep. 20, 2018 (TW) .................................. 107133173

(51) Int. Cl.
*C08F 8/14* (2006.01)
(52) U.S. Cl.
CPC ...................................... *C08F 8/14* (2013.01)
(58) Field of Classification Search
CPC ........ C08F 8/14; C08F 220/06; C08F 120/06; C08F 20/06; C01G 3/02; C01G 3/04; C01G 3/10; C01G 23/02; C01G 23/04; C01G 25/02; C01G 25/04; C01G 25/06; C01G 27/02; C01G 27/06; C01G 31/02; C01G 31/04; C01G 27/04; C01G 45/01; C01G 45/06; C01G 39/02; C01G 45/02; C01G 49/04; C01G 47/00; C01G 49/02; C01G 51/08; C01G 51/04; C01G 49/06; C01G 49/10; C01G 49/14; C01G 51/10; C01G 51/085
See application file for complete search history.

(56) References Cited

U.S. PATENT DOCUMENTS

| | | | | |
|---|---|---|---|---|
| 2,109,877 A | * | 3/1938 | Harold | C08F 20/12 525/330.6 |
| 2,847,403 A | * | 8/1958 | Contois, Jr. | C08F 218/08 525/380 |
| 5,057,579 A | * | 10/1991 | Fock | A61Q 5/02 525/329.5 |
| 6,387,176 B1 | * | 5/2002 | Widmer | C04B 24/2647 106/808 |
| 7,652,111 B2 | * | 1/2010 | Hermeling | C08F 226/02 526/319 |
| 2013/0217808 A1 | * | 8/2013 | Sulser | C04B 24/2658 524/5 |

FOREIGN PATENT DOCUMENTS

CN 103228680 A 7/2013

OTHER PUBLICATIONS

Chen, J. Org. Chem. 2005, 70, p. 8625-8627 (Year: 2005).*

* cited by examiner

Primary Examiner — Robert C Boyle
(74) Attorney, Agent, or Firm — Muncy, Geissler, Olds & Lowe, P.C.

(57) ABSTRACT

An esterification method of a copolymer is disclosed. The esterification method includes the steps of: (A) mixing a copolymer having a carboxylic acid group, an alcohol or an aminoalcohol compound, a catalyst of formula (I), and a first solvent to obtain a first mixture; (B) reacting the first mixture at a predetermined temperature to obtain a second mixture; and (C) adding the second mixture into a second solvent; wherein the catalyst of formula (I) is shown below:

$$[M(O)_a]^{m+}X_b^{n-} \qquad (I)$$

wherein M, X, a, b, m, and n are defined in the specification.

15 Claims, No Drawings

ESTERIFICATION METHOD OF COPOLYMER

CROSS REFERENCE TO RELATED APPLICATION

This application claims the benefits of the Taiwan Patent Application Serial Number 107133173, filed on Sep. 20, 2018, the subject matter of which is incorporated herein by reference.

BACKGROUND OF THE INVENTION

1. Field of the Invention

The present disclosure relates to an esterification method of a copolymer and, more particularly, to an esterification method of a copolymer using an oxometallic complex as a catalyst.

2. Description of Related Art

Generally, the esterified polymer product can only be obtained by esterification of small molecule fragments, followed by polymerization. However, several disadvantages such as cumbersome steps, long time consumption, high cost, or low transesterification rate, etc. are found in the conventional esterification. In addition, because the process often requires the use of strong acid for catalysis, it will also cause harm to the environment.

Therefore, there is an urgent need to develop a new esterification method for the copolymer, which can simplify the process, save time, decrease the cost, or reduce environmental burden.

SUMMARY OF THE INVENTION

In view of the above, the present disclosure utilizes an oxometallic complex as a catalyst to catalyze a copolymer directly for esterification so as to simplify the process and save time or cost. In particular, the oxometallic complex is biochemically absorbable and metabolizable to reduce the environmental burden.

The present disclosure provides a catalyst, as shown in the following formula (I), for the catalytic esterification of a copolymer:

$$[M(O)_a]^{m+} X_b^{n-} \quad (I)$$

wherein M is an element selected from the group consisting of group IB, IVB, VB, VIB, VIIB, and VIIIB elements; X is Cl, Br, I, OH, OAc, OC(O)Ar, OC(O)(CF$_2$)$_c$CF$_3$, OC(O)C$_{12}$H$_{25}$, [(OSO$_2$C$_6$H$_4$—CHCH$_2$)$_n$], OTf, OTs, SO$_4$, SO$_3$C$_{12}$H$_{25}$, acetylacetonate (acac), or a mixture thereof; a is an integer from 0 to 3; b is an integer from 1 to 4; m is an integer from 2 to 4; n is an integer from 1 to 2; and c is an integer from 1 to 6, in which Ar is a C$_{6\text{-}20}$ aryl; and [(OSO$_2$C$_6$H$_4$—CHCH$_2$)$_n$] has a structural formula of

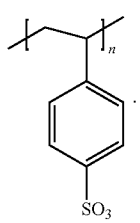

Further, the present disclosure provides an esterification method of a copolymer, comprising the steps of: (A) mixing a copolymer having a carboxylic acid group, an alcohol or an aminoalcohol compound, a catalyst of formula (I), and a first solvent to obtain a first mixture; (B) reacting the first mixture at a predetermined temperature to obtain a second mixture; and (C) adding the second mixture into a second solvent.

In the catalyst represented by formula (I) of the present disclosure, a may be 0, and M may be Ti(IV), Zr(IV), Hf(IV), V(III), Fe(II/III), Cu(I/II), Mn(II/III), Co(II), or Ni(II).

In the catalyst represented by formula (I) of the present disclosure, M(O)$_a$ may be BiO, VO, VO$_3$, ZrO, HfO, WO$_2$, MoO$_2$, CrO$_2$, or ReO$_3$.

In the catalyst represented by formula (I) of the present disclosure, Hf(O)Cl$_2$, V(O)Cl$_2$, V(O)[(O$_3$SC$_6$H$_4$CHCH$_2$)$_n$]$_2$, V(O)Cl$_3$, V(O)(OTf)$_2$, V(O)(OCOR)$_2$, MoO$_2$Cl$_2$, Mn(O)(OCOR), FeCl$_3$, Zr(O)Cl$_2$, Zr(OAc)$_x$(OH)$_y$(x+y=4), Ti(O)(acac)$_2$, V(O)SO$_4$, V(O)(acac)$_2$, MoO$_2$(acac)$_2$, Mn(II)SO$_4$, or FeSO$_4$ are included, but the present disclosure is not limited thereto, and the catalysts may be used singly or in combination. In particular, R is a C$_{6\text{-}20}$ aryl.

In one embodiment of the present disclosure, the copolymer having the carboxylic acid group may have a structure of formula (II) below:

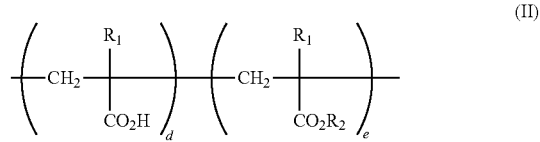

wherein R$_1$ is H, or a C$_{1\text{-}6}$ alkyl; R$_2$ is a C$_{1\text{-}12}$ alkyl or CH$_2$(CH$_2$OCH$_2$)$_p$CH$_2$OR$_3$, and d and e are each independently an integer from 5 to 150; wherein R$_3$ is a C$_{1\text{-}6}$ alkyl, p is an integer from 0 to 12, and the copolymer having the carboxylic acid group has a weight average molecular weight of 3,000 to 12,000.

In one embodiment of the present disclosure, for the copolymer having a carboxylic acid group and the structure of formula (II), it is preferred that R$_1$ is H, or methyl; R$_2$ is a C$_{1\text{-}8}$ alkyl, or CH$_2$(CH$_2$OCH$_2$)$_p$CH$_2$OR$_3$; and d and e are each independently an integer from 10 to 90; in which R$_3$ is a C$_{1\text{-}3}$ alkyl, p is an integer from 1 to 8, and the copolymer having the carboxylic acid group has a weight average molecular weight of 3,000 to 10,000.

In another embodiment of the present disclosure, the copolymer having the carboxylic acid group may have a structure of formula (III) below:

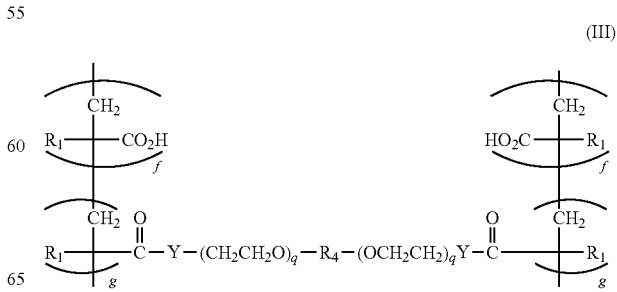

wherein $R_1$ is H, or a $C_{1-6}$ alkyl; $R_4$ is a $C_{1-6}$ alkyl, or a $C_{6-20}$ aryl; Y is O, NH, or S; q is an integer from 1 to 12; and f and g are each independently an integer from 1 to 80; wherein the copolymer having the carboxylic acid group has a weight average molecular weight of 3,000 to 12,000.

In another embodiment of the present disclosure, for the copolymer having the carboxylic acid group and the structure of formula (III), it is preferred that $R_1$ is hydrogen (H) or methyl; $R_4$ is a $C_{6-18}$ aryl (for example, $R_4$ may include, but is not limited to, phenyl, naphthyl, anthracenyl, phenanthryl and pyrenyl); Y is O, or NH; q is an integer from 1 to 10; and f and g are each independently an integer from 3 to 50, wherein the copolymer having the carboxylic acid group has a weight average molecular weight of 4,000 to 12,000.

In the esterification method of a copolymer of the present disclosure, the alcohol compound includes $C_{1-10}$ alcohols, such as methanol, ethanol, n-propanol, isopropanol, 2-butanol, n-butanol, isobutanol, tert-butanol, n-pentanol, isopentanol, 2-methyl butanol, sec-amyl alcohol, n-hexyl alcohol, 2-methyl pentanol, 2-ethyl butanol, n-heptyl alcohol, n-octyl alcohol, 2-ethyl hexanol, n-nonyl alcohol, n-decyl alcohol, cyclohexanol, cyclohexanemethanol, 2-methylcyclohexanol, or benzyl alcohol, but the present disclosure is not limited thereto. In the present disclosure, the alcohol compound is preferably a $C_{5-10}$ alcohol.

In the esterification method of a copolymer of the present disclosure, the aminoalcohol compound may be a compound of formula (IV) or formula (V) below:

$$HO(CH_2)_rN(R_5)_2 \quad (IV)$$

$$HO(CH_2)_2O(CH_2)_2N(R_5)_2 \quad (V)$$

wherein $R_5$ is a $C_{1-6}$ alkyl; and r is an integer from 2 to 10.

In one embodiment of the present disclosure, the aminoalcohol compound may be a compound of formula (IV) or formula (V), in which preferably $R_5$ is a $C_{1-3}$ alkyl; and r is an integer from 2 to 6. For example, the aminoalcohol compound may be 2-dimethylaminoethanol, but the present disclosure is not limited thereto.

As used herein, "alkyl" and "aryl" may be unsubstituted or may be substituted by halogen, alkenyl, aryl, or heteroaryl group.

In the esterification method of a copolymer of the present disclosure, the first solvent is not particularly limited as long as it can serve as a solvent for the reaction. Preferably, the first solvent is an aromatic solvent, such as benzene, toluene or xylene, but the present disclosure is not limited thereto.

In the esterification method of a copolymer of the present disclosure, the second solvent is not particularly limited as long as it can induce the product to precipitate. Preferably, the second solvent is water, a $C_{1-5}$ alcohol, a $C_{5-10}$ alkane, a petroleum ether, or a mixture thereof. In particular, the $C_{1-5}$ alcohol comprises methanol, ethanol, n-propanol, isopropanol, 2-butanol, n-butanol, isobutanol, tert-butanol, n-pentanol, isopentanol, 2-methyl butanol, sec-amyl alcohol, or a mixture thereof, but the present disclosure is not limited thereto. The $C_{5-10}$ alkane comprises pentane, hexane, heptane, octane, nonane, decane, cyclopentane, cyclohexane, cycloheptane, cyclooctane, or a mixture thereof, but the present disclosure is not limited thereto.

In the esterification method of a copolymer of the present disclosure, the predetermined temperature of the reaction is not particularly limited as long as it can facilitate the reaction. Preferably, the predetermined temperature is between 0° C. and 180° C., and more preferably the predetermined temperature is between 50° C. and 120° C.

In the esterification method of a copolymer of the present disclosure, the content of the catalyst is not particularly limited as long as the esterification reaction of the copolymer can be catalyzed. Preferably, the catalyst is present in an amount of from 0.1% to 20% by weight based on a total weight of the first mixture, for example from 0.1% to 15% by weight, from 0.1% to 10% by weight, or from 0.1% to 5% by weight, but the present disclosure is not limited thereto.

DETAILED DESCRIPTION OF THE PREFERRED EMBODIMENT

The detailed description of the present disclosure is described below by way of specific embodiments, and those skilled in the art can readily appreciate the other advantages and efficacies of the present disclosure from the specification. The present disclosure may also be implemented or applied by other different embodiments. The details of the specification may also be applied to various aspects and applications, and various modifications and variations may be made without departing from the spirit of the present invention.

Synthesis of the Catalyst

In the present embodiment, the catalyst can be synthesized according to the following reaction formulae.

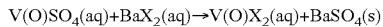

$$V(O)SO_4(aq)+BaX_2(aq) \rightarrow V(O)X_2(aq)+BaSO_4(s)$$

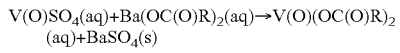

$$V(O)SO_4(aq)+Ba(OC(O)R)_2(aq) \rightarrow V(O)(OC(O)R)_2(aq)+BaSO_4(s)$$

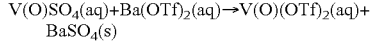

$$V(O)SO_4(aq)+Ba(OTf)_2(aq) \rightarrow V(O)(OTf)_2(aq)+BaSO_4(s)$$

$$V(O)SO_4(aq)+Ba(OTs)_2(aq) \rightarrow V(O)(OTs)_2(aq)+BaSO_4(s)$$

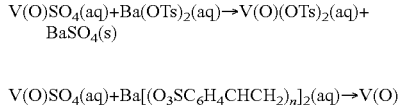

$$V(O)SO_4(aq)+Ba[(O_3SC_6H_4CHCH_2)_n]_2(aq) \rightarrow V(O)[(O_3SC_6H_4CHCH_2)_n]_2(aq)+BaSO_4(s)$$

Vanadium sulphate ($VOSO_4$-$5H_2O$, 2.5 mmol) was placed in a dry double-necked round bottom flask (50 mL), followed by anhydrous methanol (2.5 mL) To the resulting solution, a solution of $BaX_2$ (1 equivalent, 2.5 mmol) (for example, $Ba(OAc)_2$, $BaOTs_2$, $BaOTf_2$, or $Ba[(O_3SC_6H_4CHCH_2)_n]_2$) in methanol (2.5 mL) was slowly added at room temperature. After stirring for 30 minutes, the reaction mixture is cloudy and is accompanied by a large amount of barium sulfate precipitation. The mixture was filtered through a plug of celite, and the obtained filtrate was evaporated to give a dark blue solid. The resulting solid was dried under vacuum at 120° C. for 4 hours. The product obtained can be stored in a dry box for several weeks and can be used directly.

Esterification of the Copolymer

Embodiments of the present disclosure may perform esterification of the copolymer according to the following Scheme I or Scheme II.

Scheme I

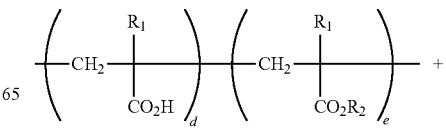

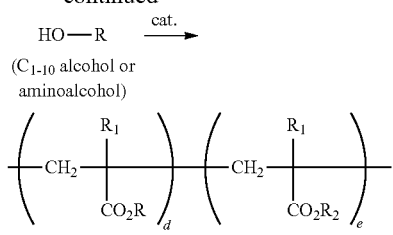
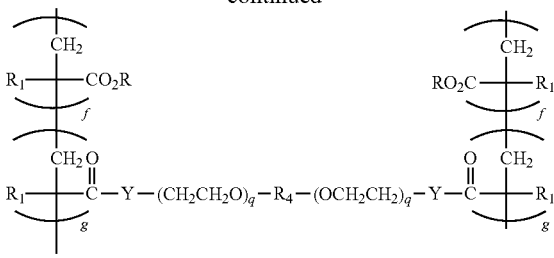

Example 1

A copolymer having a carboxylic acid group ($R_1$=$CH_3$, $R_2$=$C_6H_{13}$, MW=4172, 1.0 g), 2-dimethylaminoethanol (0.5 mL, 5.0 mmol), a catalyst of formula (I) (0.1 mmol), and toluene (15 mL) are placed in a double-necked round bottom flask (25 mL) equipped with Dean-Stark (1 mL $H_2O$) and a condenser. The reaction mixture was refluxed and the reaction was monitored by TLC or $^1$H NMR every 12 hours. The reaction mixture was poured into hexane to induce precipitation. The purified product was dissolved in chloroform, and the small molecule impurity was removed by filtration to obtain a final product. Here, the catalyst used is $ZrOCl_2$ or $TiO(acac)_2$.

$^1$H NMR (400 MHz, CDCl3) δ 0.90 (s, 6H), 1.04 (s, 2H), 1.32 (s, 5H), 1.61 (s, 2H), 1.85-1.90 (br, 4H), 2.28 (s, 6H), 2.56 (s, 2H), 3.93 (s, 2H), 4.06 (s, 2H).

Mn=4796 (THF); Mw=5684; PDI=1.19.

Example 2

A copolymer having a carboxylic acid group ($R_1$=$CH_3$, $R_2$=$CH_2(CH_2OCH_2)_4CH_2OCH_3$, MW=6304, 1.0 g), $C_6H_{13}OH$ (2.2 mL, 11.2 mmol), a catalyst of formula (I) (0.1 mmol), and toluene (15 mL) are placed in a double-necked round bottom flask (25 mL) equipped with Dean-Stark (1 mL $H_2O$) and a condenser. The reaction mixture was refluxed and the reaction was monitored by TLC or $^1$H NMR every 12 hours. The reaction mixture was poured into hexane to induce precipitation. The purified product was dissolved in chloroform, and the small molecule impurity was removed by filtration to obtain a final product. Here, the catalyst used is $ZrOCl_2$ or $TiO(acac)_2$.

$^1$H NMR (400 MHz, CDCl3) δ 0.85-0.90 (br, 9H), 1.03 (s, 3H), 1.32 (s, 10H), 1.61 (s, 9H), 1.89-1.91 (br, 5H), 3.38 (s, 3H), 3.55 (s, 2H), 3.66 (s, 15H), 3.92 (s, 3H), 4.09 (s, 2H).

Mn=6286 (THF); Mw=7732; PDI=1.23.

Scheme II

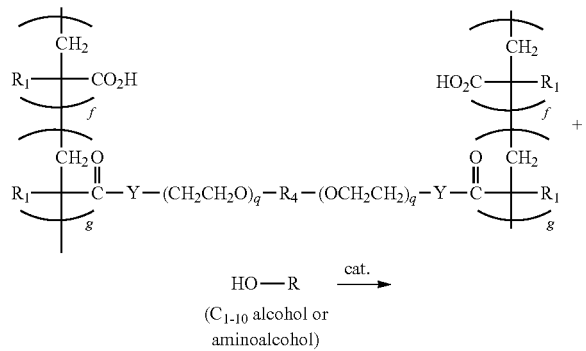

Example 3

A copolymer having a carboxylic acid group ($R_1$=$CH_3$, $R_4$ is phenyl, Y=O, q=7, MW=6304, 1.0 g), $C_6H_{13}OH$ (1.0 mL, 5.9 mmol), a catalyst of formula (I) (0.1 mmol), and toluene (15 mL) are placed in a double-necked round bottom flask (25 mL) equipped with Dean-Stark (1 mL $H_2O$) and a condenser. The reaction mixture was refluxed and the reaction was monitored by TLC or $^1$H NMR every 12 hours. The reaction mixture was poured into hexane to induce precipitation. The purified product was dissolved in chloroform, and the small molecule impurity was removed by filtration to obtain a final product. Here, the catalyst used is $ZrOCl_2$ or $TiO(acac)_2$.

$^1$H NMR (400 MHz, CDCl3) δ 0.99-1.18 (br, 10H), 1.32-1.35 (br, 7H), 1.62 (s, 8H), 1.95 (br, 3H), 3.64-3.71 (br, 17H), 3.83 (s, 2H), 3.95 (s, 2H), 6.79 (br, 2H), 7.11 (br, 2H).

Mn=6249 (THF); Mw=7811; PDI=1.25.

Dispersion Effect Test

The copolymer of Example 3 (1 g) and the commercially available dispersant (1 g) were dissolved in 1 mL of tetrahydrofuran, into which 135 uL of yellow pigment (from a solution of 500 mg yellow pigment in 3 mL of tetrahydrofuran) was added, followed by grinding and stirring for 30 seconds. The dispersion of the yellow pigment was observed and shown in Table 1.

TABLE 1

| | Dispersion effect | Particle suspension |
|---|---|---|
| Copolymer of Example 1 | Excellent | No particle suspension or uneven dispersion |
| Copolymer of Example 3 | Excellent | No particle suspension or uneven dispersion |
| Commercially available dispersant | Good | Significant particle suspension |

The above specific embodiments are to be construed as illustrative only and do not limit the remainder of this disclosure in any way.

Although the present invention has been explained in relation to its preferred embodiment, it is to be understood that many other possible modifications and variations can be made without departing from the spirit and scope of the invention as hereinafter claimed.

What is claimed is:

1. An esterification method of a copolymer, comprising:
   (A) mixing a copolymer having a carboxylic acid group, an alcohol or an aminoalcohol compound, a catalyst of formula (I) below, and a first solvent to obtain a first mixture:

$$[M(O)_a]^{m+}X_b^{n-} \quad (I)$$

wherein M is an element selected from the group consisting of group IB, IVB, VB, VIB, VIIB, and VIIIB elements;

X is Cl, Br, I, OH, OAc, OC(O)Ar, OC(O)(CF$_2$)$_c$CF$_3$, OC(O)C$_{12}$H$_{25}$, [(OSO$_2$C$_6$H$_4$—CHCH$_2$)$_n$], OTf, OTs, SO$_4$, SO$_3$C$_{12}$H$_{25}$, acetylacetonate (acac), or a mixture thereof;

a is an integer from 0 to 3;

b is an integer from 1 to 4;

m is an integer from 2 to 4;

n is an integer from 1 to 2;

c is an integer from 1 to 6; and

Ar is a C$_{6-20}$ aryl;

(B) converting the carboxylic acid group of the copolymer in the first mixture into an ester group at a predetermined temperature to obtain a reaction product; and (C) adding the reaction product into a second solvent.

2. The esterification method according to claim 1, wherein a is zero, and M is Ti(IV), Zr(IV), Hf(IV), V(III), Fe(II/III), Cu(I/II), Mn(II/III), Co(II), or Ni(II).

3. The esterification method according to claim 1, wherein M(O)$_a$ is VO, VO$_3$, ZrO, HfO, WO$_2$, MoO$_2$, CrO$_2$, or ReO$_3$.

4. The esterification method according to claim 1, wherein the copolymer having the carboxylic acid group has a structure of formula (II) below:

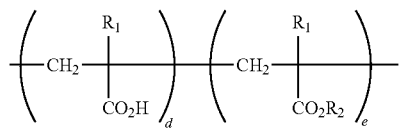

(II)

wherein R$_1$ is H or a C$_{1-6}$ alkyl;

R$_2$ is a C$_{1-12}$ alkyl or CH$_2$(CH$_2$OCH$_2$)$_p$CH$_2$OR$_3$, wherein R$_3$ is a C$_{1-6}$ alkyl, and p is an integer from 0 to 12; and d and e are each independently an integer from 5 to 150;

wherein a weight average molecular weight of the copolymer having the carboxylic acid group is from 3,000 to 12,000.

5. The esterification method according to claim 4, wherein R$_1$ is H or methyl, R$_2$ is a C$_{1-8}$ alkyl or CH$_2$(CH$_2$OCH$_2$)$_p$CH$_2$OR$_3$, wherein R$_3$ is a C$_{1-3}$ alkyl, and p is an integer from 1 to 8.

6. The esterification method according to claim 1, wherein the copolymer having the carboxylic acid group has a structure of formula (III) below:

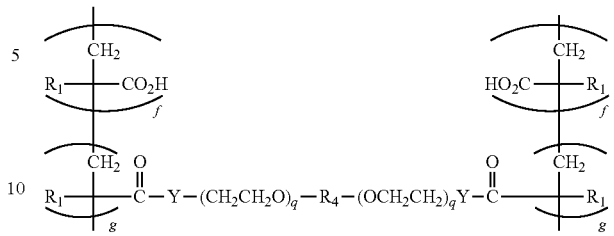

(III)

wherein R$_1$ is H or a C$_{1-6}$ alkyl;

R$_4$ is a C$_{1-6}$ alkyl or a C$_{6-20}$ aryl;

Y is O, NH, or S;

q is an integer from 1 to 12; and f and g are each independently an integer from 1 to 80;

wherein a weight average molecular weight of the copolymer having the carboxylic acid group is from 3,000 to 12,000.

7. The esterification method according to claim 6, wherein R$_1$ is H or methyl; R$_4$ is a C$_{6-18}$ aryl; Y is O or NH; and q is an integer from 1 to 10.

8. The esterification method according to claim 1, wherein the alcohol compound is a C$_{1-10}$ alcohol.

9. The esterification method according to claim 8, wherein the alcohol compound is a C$_{5-10}$ alcohol.

10. The esterification method according to claim 1, wherein the aminoalcohol compound is a compound of formula (IV) or formula (V) below:

$$HO(CH_2)_rN(R_5)_2 \quad (IV)$$

$$HO(CH_2)_2O(CH_2)_2N(R_5)_2 \quad (V)$$

wherein R$_5$ is a C$_{1-6}$ alkyl; and r is an integer from 2 to 10.

11. The esterification method according to claim 10, wherein R$_5$ is a C$_{1-3}$ alkyl; and r is an integer from 2 to 6.

12. The esterification method according to claim 1, wherein the first solvent is an aromatic solvent.

13. The esterification method according to claim 1, wherein the second solvent is water, a C$_{1-5}$ alcohol, a C$_{5-10}$ alkane, a petroleum ether, or a mixture thereof.

14. The esterification method according to claim 1, wherein the catalyst is present in an amount of 0.1 wt % to 20 wt %, based on a total weight of the first mixture.

15. The esterification method according to claim 1, wherein the predetermined temperature is between 0° C. and 180° C.

* * * * *